United States Patent
Dai et al.

(10) Patent No.: US 11,501,168 B2
(45) Date of Patent: Nov. 15, 2022

(54) LEARNING LONGER-TERM DEPENDENCIES IN NEURAL NETWORK USING AUXILIARY LOSSES

(71) Applicant: Google LLC, Mountain View, CA (US)

(72) Inventors: Andrew M. Dai, San Francisco, CA (US); Quoc V. Le, Sunnyvale, CA (US); Hoang Trieu Trinh, Mountain View, CA (US); Thang Minh Luong, Mountain View, CA (US)

(73) Assignee: Google LLC, Mountain View, CA (US)

(*) Notice: Subject to any disclaimer, the term of this patent is extended or adjusted under 35 U.S.C. 154(b) by 738 days.

(21) Appl. No.: 16/273,041

(22) Filed: Feb. 11, 2019

(65) Prior Publication Data

US 2019/0251449 A1   Aug. 15, 2019

Related U.S. Application Data

(60) Provisional application No. 62/628,901, filed on Feb. 9, 2018.

(51) Int. Cl.
*G06N 3/08* (2006.01)
*G06N 3/04* (2006.01)

(52) U.S. Cl.
CPC .......... *G06N 3/084* (2013.01); *G06N 3/0454* (2013.01); *G06N 3/088* (2013.01)

(58) Field of Classification Search
CPC ...... G06N 3/084; G06N 3/088; G06N 3/0454; G06N 3/0445
See application file for complete search history.

(56) References Cited

U.S. PATENT DOCUMENTS

| | | | | |
|---|---|---|---|---|
| 9,972,339 | B1* | 5/2018 | Sundaram | G10L 25/30 |
| 11,288,593 | B2* | 3/2022 | Sun | G06F 40/253 |
| 2018/0046912 | A1* | 2/2018 | Kurata | G06N 3/0454 |
| 2018/0053108 | A1* | 2/2018 | Olabiyi | B60W 50/0097 |
| 2018/0203852 | A1* | 7/2018 | Goyal | G06N 3/08 |
| 2019/0188463 | A1* | 6/2019 | Sodhani | G06K 9/6262 |
| 2019/0287012 | A1* | 9/2019 | Celikyilmaz | G06N 3/0445 |
| 2020/0371491 | A1* | 11/2020 | Wong | G05B 13/04 |

(Continued)

OTHER PUBLICATIONS

Sordoni A, Bengio Y, Vahabi H, Lioma C, Grue Simonsen J, Nie JY. A hierarchical recurrent encoder-decoder for generative context-aware query suggestion. Inproceedings of the 24th ACM international on conference on information and knowledge management Oct. 17, 2015 (pp. 553-562). (Year: 2015).*

(Continued)

*Primary Examiner* — Michael J Huntley
*Assistant Examiner* — Oluwatosin O Alabi
(74) *Attorney, Agent, or Firm* — Fish & Richardson P.C.

(57) ABSTRACT

Methods, systems, and apparatus, including computer programs encoded on computer storage media, for structuring and training a recurrent neural network. This describes a technique that improves the ability to capture long term dependencies in recurrent neural networks by adding an unsupervised auxiliary loss at one or more anchor points to the original objective. This auxiliary loss forces the network to either reconstruct previous events or predict next events in a sequence, making truncated backpropagation feasible for long sequences and also improving full backpropagation through time.

20 Claims, 4 Drawing Sheets

(56) References Cited

U.S. PATENT DOCUMENTS

2020/0387798 A1* 12/2020 Hewage ................ G06N 3/088

OTHER PUBLICATIONS

Abadi et al. "TensorFlow: A System for Large-Scale Machine Learning," Proceedings of the 12th USENIX Symposium on Operating Systems Design and Implementation, Nov. 2-4, 2016, 20 pages.

Bengio et al. "Scheduled Sampling for Sequence Prediction with Recurrent Neural Networks," arXiv 1506.03099v3, Sep. 23, 2015, 9 pages.

Dai et al. "Semi-supervised Sequence Learning," arXiv 1511.01432v1, Nov. 4, 2015, 10 pages.

* cited by examiner

LEARNING LONGER-TERM DEPENDENCIES IN NEURAL NETWORK USING AUXILIARY LOSSES

CROSS-REFERENCE TO RELATED APPLICATIONS

This application claims the benefit under 35 U.S.C. § 119(e) of the filing date of U.S. Patent Application No. 62/628,901, for Learning Longer-Term Dependencies In Neural Network Using Auxiliary Losses, which was filed on Feb. 9, 2018, and which is incorporated here by reference.

BACKGROUND

This specification relates to neural network's capturing long-term dependencies in sequences.

Many data processing tasks involve converting an ordered sequence of inputs into an ordered sequence of outputs. For example, machine translation systems translate an input sequence of words in one language into a sequence of words in another language. As another example, pronunciation systems convert an input sequence of graphemes into a target sequence of phonemes.

Neural networks are machine learning models that employ one or more layers of nonlinear units to predict an output for a received input. Deep neural networks include multiple hidden layers in addition to an input layer and an output layer. The output of each hidden layer is generally used as input to a next layer in the network, i.e., the next hidden layer or the output layer. Each layer of the network generates an output from a received input in accordance with current values of a respective set of parameters.

Some neural networks are recurrent neural networks. A recurrent neural network ("RNN") is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

Many important applications in artificial intelligence require the understanding of long term dependencies between events in a sequence. For example, in natural language processing, it is sometimes necessary to understand relationships between distant events described in a book to answer questions about it. Typically, this is achieved by gradient descent and backpropagation through time (BPTT) with recurrent networks.

SUMMARY AND INVENTION

This specification describes a system implemented as computer programs on one or more computers in one or more locations that implement a recurrent neural network, and in particular an LSTM neural network, that includes in the loss function an unsupervised auxiliary loss in addition to the main supervised loss, which unsupervised auxiliary loss encourages recurrent networks to remember past and predict future events. The loss function can reconstruct or predict, as the case may be, a random segment in the sequence before or after an anchor point. This loss function explicitly trains recurrent networks to remember and predict, such that the system only needs a few BPTT steps for the supervised loss.

Including unsupervised auxiliary losses significantly improves optimization and generalization of LSTM neural networks. Moreover, using this technique, one does not have to perform lengthy BPTT during training to obtain good results. Also, very long sequences can be processed, where otherwise vanishing or exploding gradients as well as the cost of lengthy BPTT become critical bottlenecks.

The system is a system for generating a target sequence that can include a respective output at each of multiple output time steps from an input sequence that includes a respective input at each of multiple input time steps.

For example, the system may be an image classification system. That is, if the input sequence is a sequence of pixels of an image, the output may be a classification of the image, e.g., classifying the image as being one of a particular breed of dog.

As another example, the system may be a document classification system. That is, if the input sequence is a sequence of characters or a sequence of words of a free-text document, the output may be a classification of the document into one of a number of pre-defined categories.

As another example, the system may be a neural machine translation system. That is, if the input sequence is a sequence of words in an original language, e.g., a sentence or phrase, the target sequence may be a translation of the input sequence into a target language, i.e., a sequence of words in the target language that represents the sequence of words in the original language.

As another example, the system may be a speech recognition system. That is, if the input sequence is a sequence of audio data representing a spoken utterance, the target sequence may be a sequence of graphemes, characters, or words that represents the utterance, i.e., is a transcription of the input sequence.

As another example, the system may be a natural language processing system. For example, if the input sequence is a sequence of words in an original language, e.g., a sentence or phrase, the target sequence may be a summary of the input sequence in the original language, i.e., a sequence that has fewer words than the input sequence but that retains the essential meaning of the input sequence. As another example, if the input sequence is a sequence of words that form a question, the target sequence can be a sequence of words that form an answer to the question. As yet another example, if the input sequence is a sequence of words, the target sequence may be a sequence that defines a parse tree, e.g., a dependency parse or a constituency parse, of the input sequence.

As another example, the system may be part of a computer-assisted medical diagnosis system. For example, the input sequence can be a sequence of data from an electronic medical record and the target sequence can be a sequence of predicted treatments.

As another example, the system may be an image generation system that generates images conditioned on a particular type of input, e.g., a smaller image, an object category, or a natural language text sequence. In these examples, the system may receive a representation of the image as a sequence and then generate the output image as a sequence of color values, i.e., of color channel values for the pixels of the output image, or as a two-dimensional structure of color values.

As another example, the system may be a system that receives as input one or more video frames. For example, the system can receive as input a sequence of video frames and then predict the next frame, i.e., as a sequence of color values or as a two-dimensional structure of color values. As another example, the system can receive as input a sequence of video frames from a video and then generate a natural language text sequence that describes the video.

As another example, the system may be a system that processes sequences of biological data, e.g., genome sequencing reads.

BRIEF DESCRIPTION OF THE DRAWINGS

Like reference numbers and designations in the various drawings indicate like elements.

DETAILED DESCRIPTION

Figure 1:
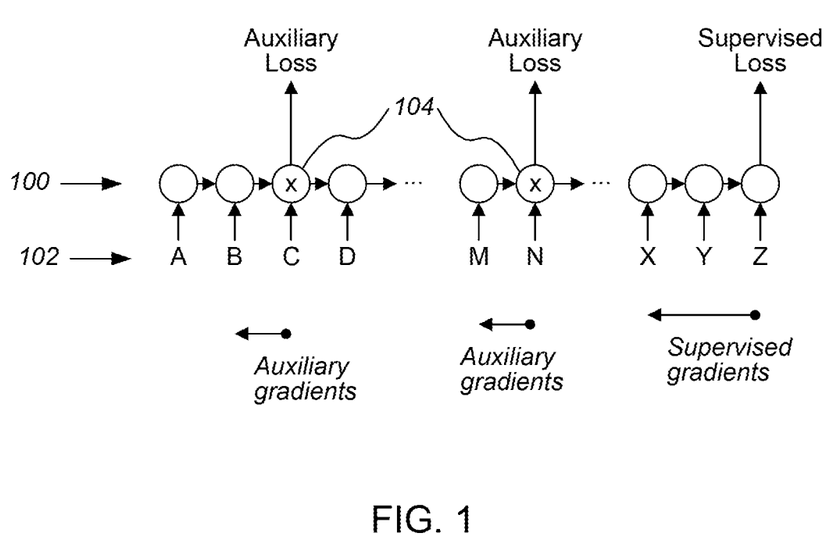
FIG. 1 is a schematic diagram showing an overview of an example of using auxiliary losses and anchor points in a recurrent neural network.

FIG. 1 is a schematic diagram showing an overview of an example of using auxiliary losses and anchor points in a recurrent neural network. In this example, the goal is to use a recurrent neural network 100 to read a sequence 102 (illustrated as elements A, B, . . . , Z) and classify it. As is conventional, the RNN is shown in unrolled form, with a length equal to the length of the input sequence of tokens A through Z. One or multiple anchor positions, nodes 104 in the neural network, each illustrated with an x, are randomly sampled, and an unsupervised auxiliary loss is inserted at every location of these anchor points. The gradients for the auxiliary loss or losses and for the supervised loss are truncated to a number of time steps, e.g., 300 time steps. As a result, backpropagation cost is effectively constant regardless of the length of the input.

Figure 2A:
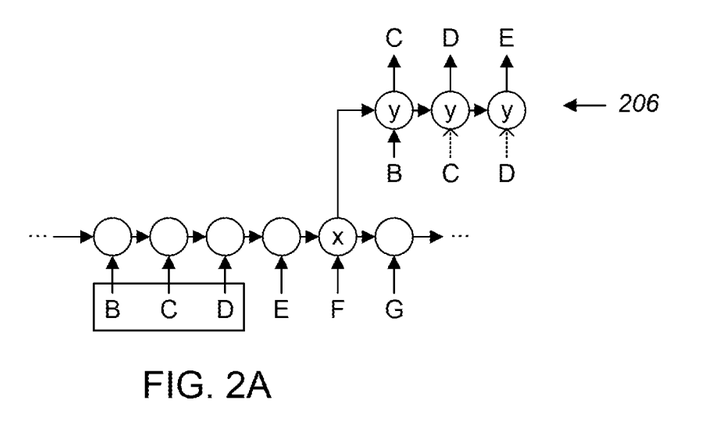
FIGS. 2A and 2B are schematic diagrams showing the insertion of auxiliary losses and anchor points in a recurrent neural network.
Figure 2B:
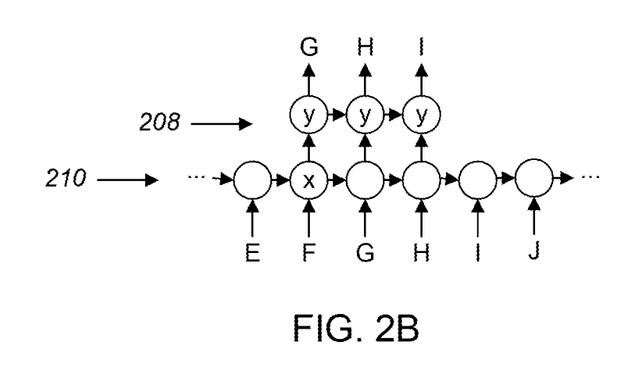

FIGS. 2A and 2B are schematic diagrams showing the insertion of auxiliary losses and anchor points in a recurrent neural network for reconstruction and prediction, respectively.

The goal is to train the recurrent network to read a sequence and classify it. One or more anchor positions are randomly sampled, and an unsupervised auxiliary loss is inserted at every location of these anchor points.

In FIG. 2A, an auxiliary loss is illustrated that predicts a random subsequence BCD that occurs before F, the random anchor point. The sequence element B is inserted into a decoder network 206 to start the reconstruction, while C and D are optionally fed into the decoder network. That is, in reconstructing past events, a subsequence before each anchor point is sampled, illustrated as subsequence of tokens BCD, and the first token of the subsequence, B, is inserted into a decoder network 206. The decoder network is trained to predict the rest of the subsequence. With this training, the anchor points serve as a temporary memory for the recurrent network to remember past events in the sequence. If enough anchor points are chosen, the memory of past events is built over the sequence such that when the sequence end is reached, the classifier network remembers enough about the sequence and can do a good job of classifying it. Consequently, the classifier only needs a few backpropagation steps to fine-tune the weights of the LSTM cells of the classifier network, because good embeddings of the input sequence has been learned by optimizing the auxiliary objective. LSTM networks with this structure may be referred to a reconstruct-LSTMs, or r-LSTMs.

For the auxiliary losses, the system can use a neural network 206 (also called an "auxiliary" neural network) that is a two-layer LSTM in which the bottom layer is initialized from the current state of the main classification LSTM, while the top one starts with zero state.

In FIG. 2B, an auxiliary loss is illustrated that predicts the subsequence GHI by stacking an auxiliary RNN 208 on top of the main one 210. As in FIG. 1, the anchor point is illustrated with an x; here the nodes of the auxiliary RNN are illustrated with a y. In this prediction case, the decoder network is trained to predict the next token given the current one sequentially, over a subsequence starting from the anchor point. LSTM networks with this structure may be referred to a predict-LSTMs, or p-LSTMs.

For the auxiliary losses, the system can use a neural network 208 (also called an "auxiliary" neural network) that is a two-layer LSTM in which the bottom layer is initialized from the current state of the main classification LSTM, while the top one starts with zero state.

For both kinds of networks, gradients for both the auxiliary losses and the main, supervised loss are truncated in both cases to keep the overall cost of BPTT constant. In implementations based on TensorFlow, truncated gradients can be achieved using the built-in tf.slop_gradient operation. (TensorFlow is described in Abadi et al., TensorFlow: A System for Large-Scale Machine Learning, in Proceedings of the 12th USENIX Symposium on Operating Systems Design and Implementation (OSDI '16), pp. 265-283, Nov. 2-4, 2016. The software is available from https://tensorflow.org.)

The r-LSTMs and p-LSTMs can be trained in two phases. The first phase is pure unsupervised pretraining where only the auxiliary loss is minimized. In the second phase, semi-supervised learning is performed to minimize the sum of the main objective loss and the auxiliary loss or losses. The auxiliary loss can be obtained as the sum of the losses evaluated at each sampled segment, i.e., at each anchor point, which can be calculated by averaging losses on all predicted tokens in that segment.

The auxiliary LSTM that performs reconstruction can be trained with scheduled sampling, a technique described in Bengio et al., Scheduled sampling for sequence prediction with recurrent neural networks, in Advances in Neural Information Processing Systems, 2015, pp. 1171-1179. For sequences of characters, the auxiliary loss is the cross-entropy loss between a ground truth one-hot vector and the predicted distribution produced by the decoder network. For other types of input, each token is treated as a continuous, multi-dimensional real vector and $L_2$ distance minimization is used to calculate the loss.

Figure 3:
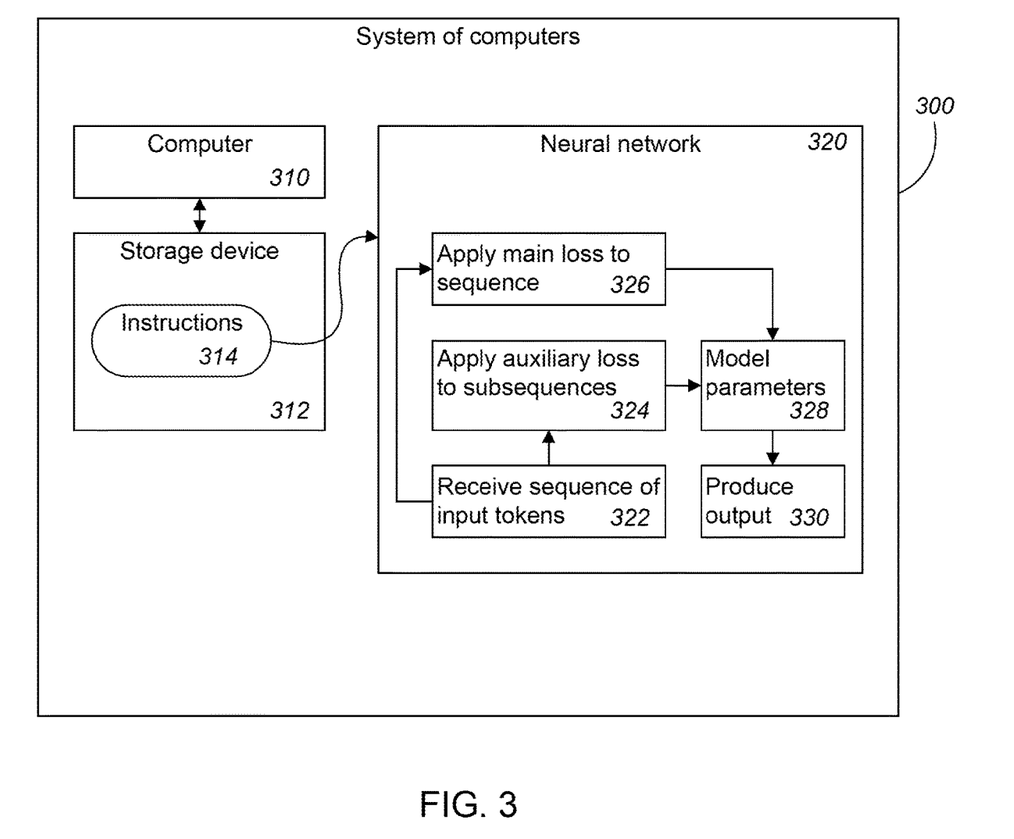
FIG. 3 is a schematic diagram illustrating an example implementation of the techniques described in this specification.

FIG. 3 is a schematic diagram illustrating an example implementation of the techniques described in this specification. This implementation includes a system 300 of one or more computers 310 and one or more storage devices 312 storing instructions 314 that when executed by the one or more computers cause the one or more computers to implement a neural network 320 receiving 322 a sequence of input tokens and producing an output 330 determined by model parameters 328 determined by training the neural network with a loss function that includes at least one auxiliary loss 324 in addition to a main supervised loss 326. A respective auxiliary loss is applied at one or more randomly selected positions, denoted as anchor points, in the input sequence of input tokens; and each respective auxiliary loss is computed by a decoder neural network performing a truncated back-propagation.

Figure 4:
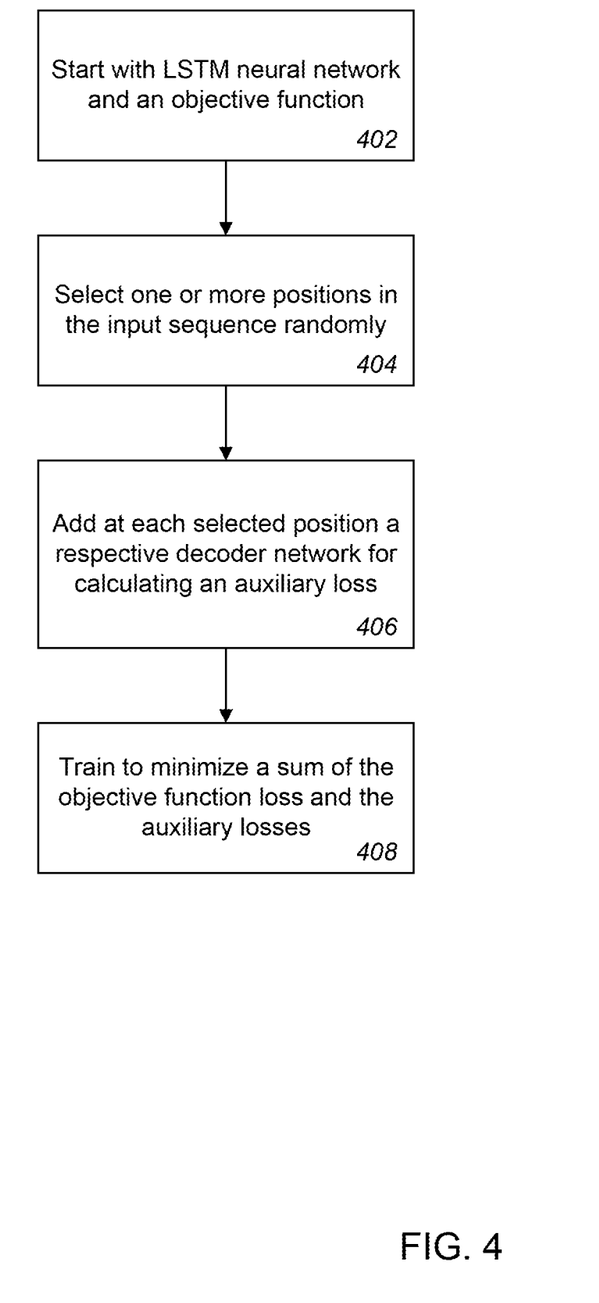
FIG. 4 is a flowchart illustrating an example method for a second phase of training a long short-term memory (LSTM) neural network, namely semi-supervised learning.

FIG. 4 is a flowchart illustrating an example method for a second phase of training a long short-term memory (LSTM) neural network, namely semi-supervised learning. The first phase only includes minimizing the auxiliary losses, namely, unsupervised pretraining. The method starts with an LSTM neural network 402. The network has an objective function. The method selects randomly one or more positions in an input sequence of tokens to the LSTM neural network as anchor points 404. The method adds to the LSTM neural network at each of the anchor points a respective decoder network for calculating an auxiliary loss for predicting a subsequence of input tokens occurring before an input token at the respective anchor point or predicting a subsequence of input tokens occurring after an input token at the respective anchor point 406. The method trains the LSTM neural network by minimizing a loss that is a sum of the one or more respective auxiliary losses and a loss calculated by the objective function 408.

In some implementations, the recurrent neural network is a single-layer main LSTM with N cells and an embedding size of N to read the input sequence. The value of N can be 128, for example. For the supervised loss, the final state of the main LSTM is passed through a two-layer feedforward network, e.g., a two-layer feedforward network, with, for example, 256 hidden units, before making a prediction. In all implementations, the reconstruction of segments can include the reconstruction of segments randomly sampled in a distant past in addition to or instead of only segments sampled in the immediate past. In all implementations, the reconstruction of segments can include the reconstruction of segments randomly sampled over an anchor point's future in addition to the past.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training workloads or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

What is claimed is:

1. A system comprising one or more computers and one or more storage devices storing instructions that when executed by the one or more computers cause the one or more computers to implement:
  a main neural network configured to receive an input sequence comprising a respective input at each of a plurality of input positions and to process, at each time step in a sequence of time steps, a respective input in the input sequence to generate a respective internal state according to trained values for a set of model parameters of the main neural network,
  wherein the trained values for the model parameters have been determined by training the main neural network using one or more auxiliary losses in addition to a main loss by performing operations comprising:
  selecting one or more particular input positions in the input sequence as anchor points, wherein the selected particular input positions are before a final input position in the input sequence;
  processing the input sequence using the main neural network to generate the internal states;
  for each anchor point:
    processing the internal state corresponding to the anchor point using a respective auxiliary neural network to generate an auxiliary output,
    determining an auxiliary loss from the generated auxiliary output, and
    backpropagating the auxiliary loss through a subsequence of the sequence of time steps ending at the time step corresponding to the anchor point; and
  determining the main loss from at least the internal state corresponding to the final input position in the input sequence and backpropagating the main loss through at least a subsequence of the sequence of time steps ending at the time step corresponding to the final input position in the input sequence.

2. The system of claim 1, wherein:
  the auxiliary output generated by at least one respective auxiliary neural network is a prediction of one or more of (i) a subsequence of the input sequence occurring before the corresponding anchor point, (ii) a subsequence of the input sequence occurring after the corresponding anchor point, or (iii) a subsequence of the input sequence occurring partially before and partially after the corresponding anchor point.

3. The system of claim 1, wherein:
  at least one respective auxiliary neural network is a recurrent neural network configured to process the internal state for the corresponding anchor point and one or more of (i) a subsequence of the input sequence occurring before the corresponding anchor point, (ii) a subsequence of the input sequence occurring after the corresponding anchor point, or (iii) a subsequence of the input sequence occurring partially before and partially after the corresponding anchor point.

4. The system of claim 1, wherein:
  the inputs in the input sequence represent pixels of an image, characters of a text, or words of a text.

5. The system of claim 1, wherein backpropagating the auxiliary loss through a subsequence of the sequence of time steps ending at the time step corresponding to the anchor point comprises:
  backpropagating the auxiliary loss through the auxiliary neural network to determine a gradient for the internal state corresponding to the anchor point; and backpropagating the determined gradient through the subsequence of the sequence of time steps ending at the time step corresponding to the anchor point.

6. The system of claim 5, wherein:
the auxiliary neural network is configured to execute at a sequence of second time steps, and
backpropagating the auxiliary loss through the auxiliary neural network comprises backpropagating the auxiliary loss through the sequence of second time steps.

7. The system of claim 1, wherein the main loss is a supervised loss and the one or more auxiliary losses are unsupervised losses.

8. The system of claim 1, wherein the respective auxiliary neural network corresponding to each anchor point is not executed at inference.

9. The system of claim 1, wherein the anchor positions are selected randomly.

10. The system of claim 1, wherein:
during a first phase of training, values for the model parameters of the main neural network are updated using only the one or more auxiliary losses, and during a second phase of training, values for the model parameters of the main neural network are updated using the main loss and the one or more auxiliary losses.

11. A non-transitory storage medium encoded with instructions that are operable, when executed by one or more computers, to cause the computers to implement:
a main neural network configured to receive an input sequence comprising a respective input at each of a plurality of input positions and to process, at each time step in a sequence of time steps, a respective input in the input sequence to generate a respective internal state according to trained values for a set of model parameters of the neural network,
wherein the trained values for the model parameters have been determined by training the main neural network using one or more auxiliary losses in addition to a main loss by performing operations comprising:
selecting one or more particular input positions in the input sequence as anchor points, wherein the selected particular input positions are before a final input position in the input sequence;
processing the input sequence using the main neural network to generate the internal states;
for each anchor point:
processing the internal state corresponding to the anchor point using a respective auxiliary neural network to generate an auxiliary output,
determining an auxiliary loss from the generated auxiliary output, and
backpropagating the auxiliary loss through a subsequence of the sequence of time steps ending at the time step corresponding to the anchor point; and
determining the main loss from at least the internal state corresponding to the final input position in the input sequence and backpropagating the main loss through at least a subsequence of the sequence of time steps ending at the time step corresponding to the final input position in the input sequence.

12. The non-transitory storage medium of claim 11, wherein:
the auxiliary output generated by at least one respective auxiliary neural network is a prediction of one or more of (i) a subsequence of the input sequence occurring before the corresponding anchor point, (ii) a subsequence of the input sequence occurring after the corresponding anchor point, or (iii) a subsequence of the input sequence occurring partially before and partially after the corresponding anchor point.

13. The non-transitory storage medium of claim 11, wherein:
at least one respective auxiliary neural network is a recurrent neural network configured to process the internal state for the corresponding anchor point and one or more of: (i) a subsequence of the input sequence occurring before the corresponding anchor point, (ii) a subsequence of the input sequence occurring after the corresponding anchor point, or (iii) a subsequence of the input sequence occurring partially before and partially after the corresponding anchor point.

14. The non-transitory storage medium of claim 11, wherein:
the inputs in the input sequence represent pixels of an image, characters of a text, or words of a text.

15. The non-transitory storage medium of claim 11, wherein backpropagating the auxiliary loss through a subsequence of the sequence of time steps ending at the time step corresponding to the anchor point comprises:
backpropagating the auxiliary loss through the auxiliary neural network to determine a gradient for the internal state corresponding to the anchor point; and
backpropagating the determined gradient through the subsequence of the sequence of time steps ending at the time step corresponding to the anchor point.

16. A method for training a main neural network configured to receive an input sequence comprising a respective input at each of a plurality of input positions and to process, at each time step in a sequence of time steps, a respective input in the input sequence to generate a respective internal state, the method comprising:
selecting one or more particular input positions in the input sequence as anchor points, wherein the selected particular input positions are before a final input position in the input sequence;
processing the input sequence using the main neural network to generate the internal states;
for each anchor point:
processing the internal state corresponding to the anchor point using a respective auxiliary neural network to generate an auxiliary output,
determining an auxiliary loss from the generated auxiliary output, and
backpropagating the auxiliary loss through a subsequence of the sequence of time steps ending at the time step corresponding to the anchor point; and
determining a main loss from at least the internal state corresponding to the final input position in the input sequence and backpropagating the main loss through at least a subsequence of the sequence of time steps ending at the time step corresponding to the final input position in the input sequence.

17. The method of claim 16, wherein the auxiliary output generated by at least one respective auxiliary neural network is a prediction of one or more of (i) a subsequence of the input sequence occurring before the corresponding anchor point, (ii) a subsequence of the input sequence occurring after the corresponding anchor point, or (iii) a subsequence of the input sequence occurring partially before and partially after the corresponding anchor point.

18. The method of claim 16, wherein:
at least one respective auxiliary neural network is a recurrent neural network configured to process the internal state for the corresponding anchor point and one or more of: (i) a subsequence of the input sequence occurring before the corresponding anchor point, (ii) a subsequence of the input sequence occurring after the corresponding anchor point, or (iii) a subsequence of the input sequence occurring partially before and partially after the corresponding anchor point.

19. The method of claim 16, wherein:
the inputs in the input sequence represent pixels of an image, characters of a text, or words of a text.

20. The method of claim 16, wherein backpropagating the auxiliary loss through a subsequence of the sequence of time steps ending at the time step corresponding to the anchor point comprises:
backpropagating the auxiliary loss through the auxiliary neural network to determine a gradient for the internal state corresponding to the anchor point; and
backpropagating the determined gradient through the subsequence of the sequence of time steps ending at the time step corresponding to the anchor point.

\* \* \* \* \*